3,401,183
METHOD FOR PREPARING ORGANO GERMANIUM, TIN AND SILICON HYDRIDES
Abe Berger, Schenectady, N.Y., assignor to General Electric Company, a corporation of New York
No Drawing. Filed Dec. 23, 1965, Ser. No. 516,119
9 Claims. (Cl. 260—429)

The present invention relates to a method for reducing organohalides of certain Group IVb elements with alkali metal hydride in the presence of a triarylborane.

Various methods are known for reducing halides or organohalides of elements such as silicon, tin and germanium, etc. For example, organosilicon hydrides can be made by reduction of organohalosilanes as illustrated by the equation, (1) $$(R)_aSi(H)_b(X) \xrightarrow[4-a-b]{<H>} (R)_cSi(H)_{4-c}$$

where R is selected from monovalent hydrocarbon radicals and halogenated monovalent hydrocarbon radicals, X is a halogen radical, a is an integer equal to from 1 to 3, inclusive, b is a whole number equal to 0 to 2, inclusive, and c is an integer equal to 1 to 3, inclusive. One method that can be used to reduce organohalides of a variety of Group IVb elements involves the use of lithium aluminum hydride in an ether solvent. Although this procedure can be satisfactorily employed for making a variety of such elemental hydrides, those skilled in the art know that it is not economically feasible to utilize lithium aluminum hydride in commercial operations. Jenkner Patents 3,043,857, and 3,100,788 show the reduction of organohalides of certain Group IVb elements, for example, organohalosilanes by the employment of sodium hydride utilizing hydrogen gas under pressure, or a combination of sodium hydride and a promoter in the form of a metallic organic compound such as an alkyl-substituted Group III metal, for example, aluminum, boron, and gallium. These methods can be satisfactorily utilized for large scale production, but they are undesirable in many other respects. For example, the employment of in situ sodium hydride utilizing hydrogen gas under pressure requires the use of high pressure equipment which can be expensive as well as present a safety hazard. In addition, experience has shown that the promotional effect of alkyl-substituted Group III metals are considerably diminished when employed in reducing organometallic halides, such as shown in Equation 1, where R is a monovalent hydrocarbon radical, or halogenated monovalent hydrocarbon radical of 3 carbon atoms or greater. Other problems can result by using alkyl-substituted Group III metals to promote the reduction of organometallic halides substituted with monovalent hydrocarbon radicals of 3 carbon atoms or greater. For example, boiling points of the organometallic reduction product and the alkyl-substituted metallic promoter, for example, an alkylaluminum, are often so close that recovery of the organometallic hydride free of the alkyl-substituted metal is often extremely difficult. In addition, to the problem of contamination and low yields of organometallic hydrides, when alkyl-substituted Group III metals are employed to promote the reduction of organometallic halides, reaction times of 24 hours or more are not unusual.

The present invention is based on a discovery that if reaction is effected in an ether solvent between an organometallic halid of the formula, (2) $$(R)_aZ(H)_b(X)_{5-a-b}$$

and an alkali metal hydride in the presence of an effective amount of a triarylborane of the formula, (3) $$R'_3B$$

total reduction of the organometallic halide, and quantitative recovery of the resulting organometallic hydride can readily be achieved, where R, X, a and b are as defined above, Z is a Group IVb metal selected from silicon, tin and germanium, R' is an aryl radical, and the sum of a and b is equal to 1 to 3, inclusive. Unexpectedly, it has been found that a total reduction time of the organometallic halide of as little as 0.5 hour or less is not unusual. In addition, unlike alkyl-substituted Group III metals which are generally spontaneously inflammable, or highly reactive to air at room temperatures, the triarylboranes of the present invention are inert at room temperatures. In addition, after reduction of the organometallic halide, the triarylboranes of the present invention can be recovered unchanged from the reaction mixture and employed further in the practice of the invention.

Radicals included by R of Formula 1 are aryl radicals such as phenyl, tolyl, xylyl, naphthyl, anthracyl, etc.; haloaryl radicals such as chlorophenyl, chloronaphthyl, etc., aralkyl radicals such as phenylethyl, benzyl, etc., aliphatic, haloaliphatic, and cycloaliphatic radicals such as alkenyl and alkyl radicals, for example, methyl, ethyl, propyl, trifluorobutyl, pentyl, octyl, etc.; alkenyl radicals such as vinyl, propenyl; cycloalkyl radicals, such as cyclohexyl, cyclohexenyl; radicals included by R' are all of the aforementioned aryl radicals and haloaryl radicals of R. Where R and R' can represent more than one radical in the above formulae, these radicals can be all the same or any two or more of the aforementioned R or R' radicals respectively.

Triarylboranes included by Formula 3 are for example, triphenylborane, tris(chlorophenyl)borane, tritolylborane, diphenylnaphthylborane, etc.

Organohalosilanes included by Formulae 1 and 4 are for example, methyltrichlorosilane, dimethylidichlorosilane, propyltrichlorosilane, butyltrichlorosilane, amyltrichlorosilane, amyldichlorosilane, amylchlorosilane, hexyltrichlorosilane, hexyldichlorosilane, hexylchlorosilane, phenyltrichlorosilane, chlorophenyltrichlorosilane, di-n-propyldichlorosilane, diphenyldichlorosilane, diphenylchlorosilane, n-propyl-n-octyldichlorosilane, tri-n-propylchlorosilane, trifluoropropyltrichlorosilane, allyltrichlorosilane, etc. Mixture of such organohalosilanes are also included within the scope of the present invention. In addition, disilanes such as hexachlorodisilane, etc. also can be reduced in accordance with the practice of the invention. In addition to the organohalosilanes of Formula 1, the present invention is also directed to the reduction of halodisilylhydrocarbons. Some of these halodisilylhydrocarbons are shown by the formula, (4) $$X_{3-b}(R'')_bSiR'''Si(R'')_bX_{3-b}$$

where X and b are as defined above, R'' is selected from hydrogen and R radicals, and R''' is selected from divalent hydrocarbon radicals and halogenated divalent hydrocarbon radicals. For example, there are included by the halodisilylhydrocarbons of Formula 4, p-bis(dimethylchlorosilyl)benzene, bis(dimethylchlorosilyl)methane, 1,3-bis-(trichlorosilyl)ethane, etc.

In addition to organohalosilanes, there are also included by Formula 2, organotinhalides such as diethyldichlorostannane, triethylchlorostannane, dibutyldichlorostannane, diphenyldichlorostannane, etc., organogermanium-halides such as methyltrichlorogermane, diphenyldichlorogermane, etc.

Included by the alkali metal hydrides that can be employed in the practice of the invention are for example, sodium hydride, potassium hydride, lithium hydride, rubium hydride, and cesium hydride. Preferably, sodium hydride is utilized.

In the practice of the invention, reaction is effected between a Group IVb organometal halide, such as shown by Formula 2, referred to hereinafter as "metal halide," and an alkali metal hydride in the presence of a triarylborane. A Group IVb metal hydride referred to hereinafter as "metal hydride" is recovered from the mixture by distillation, etc.

Although the order of addition of the various reactants is not critical, it is preferred to add the metal halide to a mixture of the alkali metal hydride, and the triarylborane in an ether solvent. During the addition, it has been found expedient to agitate the reaction mixture to facilitate reaction. Ether solvents which can be employed include for example, cellulose derivatives such as methylcellulose, ethylcellulose, etc.; saturated dialkylethers such as diethyl, dipropyl, methyl-n-propyl, methyl tert-butyl, bis-2-ethylhexyl) etc.; substituted ethers for example, bis-(chloromethyl)-1-chloroethyl ethyl, 2-chloroethyl ethyl; alicyclic ethers such as tetrahydrofuran, 1,4-dioxane, etc. Ethers which are prefered are the dimethylethers of polyethylene glycols such as diethylenegylcoldimethyl ether, triethyleneglycoldimethyl ether, tetramethyleneglycoldimethyl ether, etc.

Experience has demonstrated that effective results can be achieved if there is utilized at least one gram equivalent weight of alkali metal hydride, per gram equivalent weight of chemically combined halogen of the metal halide. In other words, a quantity of alkali metal hydride should be employed which is at least sufficient to provide for at least one chemically combined hydrogen atom for each chemically combined halogen atom of the metal halide. Excess alkali metal hydride, such as an amount sufficient to provide for up to 10 hydrogen atoms per halogen atom of the metal halide can be employed if desired. However, more or less alkali metal hydride can be utilized without interfering with the unexpected results achieved by the invention, such as in instances where the metal halide is utilized as the cosolvent. Preferably, there is utilized from about 0.01 part to about 5 parts of triarylborane per part of metal halide. A smaller amount of triarylborane can be employed but it can result in extended reaction periods; larger amounts of triarylborane can result in uncontrolled reactions.

Reaction of metal halide can be effected at a temperature in the range of between about 25° C. to 250° C. It has been found that side reactions can occur at temperatures above about 150° C. when reducing aryl substituted metal halides such as the redistribution of the aryl radicals of the metal halide in the presence of the triarylborane. It is preferred however, to utilize at a temperature between 80° C. to 120° C. Depending upon such factors as the conditions utilized, proportions of reactants, etc., a reaction time of as little as ½ hour or less to 3 hours or more will not be unusual. The course of the reaction can be followed by examining samples of the reaction mixture periodically by use of a vapor phase chromatograph.

In order that those skilled in the art will be better able to practice the invention, the following examples are given by way of illustration and not by way of limitation. All parts are by weight.

EXAMPLE 1

There were added dropwise, while maintaining substantially anhydrous conditions, 25.2 parts of diphenyldichlorosilane to a slurry at 110° C. consisting of 4.8 parts of sodium hydride, 5 parts of triphenylborane, and 75 parts of diethyleneglycoldimethyl ether. An exothermic reaction occurred immediately and the temperature of the mixture was maintained between 110° C. to 125° C. during the addition. After the addition was completed, the mixture was cooled externally and centrifuged to facilitate the separation of salts from the organic layer which were formed during the reaction. The organic layer was recovered and fractionated. There were obtained 14 parts of diphenylsilane which represented about a 77 percent yield of product based on starting reactants.

The above reaction was repeated except that there was utilized in place of the triphenylborane, the salts which were recovered from the above reaction mixture. There was obtained a 65 percent yield of diphenylsilane.

EXAMPLE 2

There were added 21.9 parts of hexyltrichlorosilane to a slurry at a temperature of 105° C. of 7.2 parts of sodium hydride, 75 parts of triethyleneglycoldimethyl ether, and 5 parts of triphenylborane. The addition was performed under substantially anhydrous conditions at a temperature of 105° C. to 120° C. over a period of about 45 minutes. Following the addition, the mixture was heated an additional 3 hours at a temperature of 95° C. The mixture was then allowed to cool and it was centrifuged to effect the separation of the salts from the organic layer. Upon fractionating the organic layer, there was obtained 9.8 parts of hexyl silane boiling at 113° C. to 114° C. which represented about an 85% yield based on starting reactants.

EXAMPLE 3

There is added dropwise over a period of one hour, 38.5 parts of triethyltinchloride to a slurry of 7.2 parts of a 50 percent suspension of sodium hydride in mineral oil, 75 parts of triethyleneglycoldimethyl ether, and 5 parts of triphenylborane. During the addition, the mixture is maintained at 110° C. under substantially anhydrous conditions. The reaction mixture then is heated for an additional 3 hours at 110° C. The mixture is then centrifuged to effect the separation of salts and the organic layer is fractionated. There is obtained a 75 percent yield of triethylstannane at a temperature between 79° C. to 81° C. at 92 mm.

EXAMPLE 4

There are added dropwise, 34 parts of diethylgermaniumdichloride to a slurry of 75 parts of diethyleneglycoldimethyl ether, 9.2 parts of sodium hydride in the form of a 50 percent suspension in mineral oil and 5 parts of triphenylborane, while the slurry is maintained at a temperature of 110° C. under substantially anhydrous conditions. A volatile reaction product is collected in a trap cooled with Dry-Ice acetone. Based on its method of preparation and its infrared spectrum, the product is dimethylgermane.

Based on the above results, those skilled in the art would know that the method of the present invention provides for substantially improved results over comparable methods of the prior art. As shown by the above examples, triarylboranes can be utilized as promoters in combination with alkali metal hydrides to provide for the reduction of a variety of metal halides of Group IVb elements. In addition, Example 1 shows that the triarylboranes of the present invention can be reused in the practice of the invention.

While the foregoing examples have of necessity been limited to only a few of the very many variables within the scope of the present invention, it should be understood that the present invention is directed to a method of making a much broader class of Group IVb metal hydrides of the formula $(R)_aZ(H)_{4-a}$ by effecting reaction in an ether solvent between a Group IVb metal halide such as shown by Formula 2 and an alkali metal hydride in the presence of an effective amount of a triarylborane such as shown by Formula 3.

What I claim as new and desire to secure by Letters Patent of the United States is:

1. A method for making organometallic hydrides which comprises (1) effecting reaction in an ether solvent between an organometallic halide of the formula, $$(R)_aZ(H)_b(X)_{4-a-b}$$

and an alkali metal hydride in the presence of an effective amount of a triarylborane of the formula, $$R'_3B$$

(2) and recovering from (1), an organometallic hydride of the formula, $$(R)_a Z(H)_{4-a}$$

where R is a member selected from monovalent hydrocarbon radicals and halogenated monovalent hydrocarbon radicals, R' is an aryl radical, X is a halogen radical, Z is a metal selected from the class consisting of silicon, tin and germanium, $a$ is an integer equal to 1 to 3, inclusive, $b$ is a whole number equal to 0 to 2, inclusive, and the sum of $a$ and $b$ is equal to 1 to 3, inclusive.

2. A method of claim 1, where the organometallic halide is an organosilicon halide.

3. The method of claim 1, where the triarylborane is triphenylborane.

4. The method of claim 1, where the alkali metal hydride is sodium hydride.

5. The method of claim 1, where the organometallic halide is an organohalostannane.

6. The method of claim 1, where the organometallic halide is an organohalogermane.

7. The method of claim 1, where there is utilized as a solvent, a polyethyleneglycoldimethyl ether.

8. The method of claim 1, where the organometallic hydride is diphenylsilane.

9. The method of claim 1, where the organometallic hydride is hexyl silane.

References Cited
UNITED STATES PATENTS

| | | | |
|---|---|---|---|
| 3,043,857 | 7/1962 | Jenkner | 260—429.7 |
| 3,099,672 | 7/1963 | Cooper et al. | 260—448.2 |
| 3,100,788 | 8/1963 | Jenkner | 260—448.2 |
| 3,231,333 | 1/1966 | Jenkner | 260—448.2 X |

TOBIAS E. LEVOW, *Primary Examiner.*

W. F. W. BELLAMY, *Assistant Examiner.*